United States Patent
Browne et al.

(10) Patent No.: US 6,944,920 B2
(45) Date of Patent: Sep. 20, 2005

(54) ELECTROSTATICALLY RELEASABLE FASTENING SYSTEM AND METHOD OF USE

(75) Inventors: Alan Lampe Browne, Grosse Pointe, MI (US); Nancy L. Johnson, Northville, MI (US); Chandra Sekhar Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 41 days.

(21) Appl. No.: 10/358,080

(22) Filed: Feb. 4, 2003

(65) Prior Publication Data

US 2004/0074067 A1 Apr. 22, 2004

Related U.S. Application Data

(63) Continuation-in-part of application No. 10/273,691, filed on Oct. 19, 2002.

(51) Int. Cl.[7] .......................... B44B 18/00; B44B 21/00
(52) U.S. Cl. ............................ 24/442; 24/451; 428/100
(58) Field of Search .......................... 24/442, 446, 447, 24/450, 451, 452; 428/100

(56) References Cited

U.S. PATENT DOCUMENTS

| | | | |
|---|---|---|---|
| 2,717,437 A | 9/1955 | DeMestral | 428/92 |
| 2,994,117 A | 8/1961 | McMullin | 24/201 |
| 3,101,517 A | 8/1963 | Fox et al. | 24/442 |

(Continued)

FOREIGN PATENT DOCUMENTS

| | | |
|---|---|---|
| DE | 199 56 011 | 6/2001 |
| EP | 0385443 | 9/1990 |
| EP | 0673709 | 9/1995 |
| JP | 401162587 | 6/1989 |
| JP | 4-314446 | 4/1992 |
| JP | 4-266970 | 9/1992 |
| JP | 08260748 | 10/1996 |
| WO | WO 99/42528 | 8/1999 |
| WO | WO 00/62637 | 10/2000 |
| WO | WO 02/45536 | 6/2002 |
| WO | WO 01/84002 | * 8/2004 |

Primary Examiner—Jack W. Lavinder
(74) Attorney, Agent, or Firm—Kathryn A. Marra (57) ABSTRACT

A releasable fastening system comprises a loop portion comprising a loop material, a hook portion comprising a plurality of hook elements, and an actuation device disposed in electrical communication with the loop portion and the hook portion. The actuation device is operable to provide electrostatic charges to the loop material and the hook elements. A method of operating a releasable fastening system comprises contacting a loop portion to a hook portion to form a releasable engagement wherein the loop portion comprises a first electrically conductive sheet and a loop material disposed at the first electrically conductive sheet and wherein the hook portion comprises a second electrically conductive sheet and a hook element disposed at the second electrically conductive sheet, maintaining constant shear and pull forces between the loop and hook portions, and introducing electrostatic charges of opposite polarities to the loop and hook portions to enhance the engagement of the hook and loop portions and of similar polarities to weaken the engagement of the hook and loop portions.

18 Claims, 5 Drawing Sheets

U.S. PATENT DOCUMENTS

| | | | |
|---|---|---|---|
| 3,128,514 A | | 4/1964 | Parker et al. .............. 24/11 HC |
| 3,138,749 A | | 6/1964 | Slibitz ......................... 318/135 |
| 3,176,364 A | | 4/1965 | Dritz ............................ 24/306 |
| 3,292,019 A | | 12/1966 | Hsu et al. .................... 310/328 |
| 3,365,757 A | | 1/1968 | Billarant ...................... 24/442 |
| 3,469,289 A | * | 9/1969 | Whitacre ...................... 24/450 |
| 3,490,107 A | * | 1/1970 | Brumlik ....................... 24/451 |
| 3,808,648 A | | 5/1974 | Billarant et al. .............. 24/450 |
| 4,169,303 A | | 10/1979 | Lemelson ..................... 24/452 |
| 4,382,243 A | | 5/1983 | Babitzka et al. ............ 335/219 |
| 4,391,147 A | | 7/1983 | Krempl et al. ................. 73/730 |
| 4,634,636 A | | 1/1987 | Yoshino et al. ............. 428/500 |
| 4,637,944 A | | 1/1987 | Walker ......................... 428/35 |
| 4,642,254 A | | 2/1987 | Walker ......................... 428/36 |
| 4,693,921 A | | 9/1987 | Billarant et al. ............. 428/100 |
| 4,752,537 A | | 6/1988 | Das ............................. 428/614 |
| 4,775,310 A | | 10/1988 | Fischer ....................... 425/308 |
| 4,794,028 A | | 12/1988 | Fischer ....................... 428/100 |
| 4,931,344 A | | 6/1990 | Ogawa et al. ............... 428/100 |
| 5,037,178 A | | 8/1991 | Stoy et al. ..................... 385/53 |
| 5,071,363 A | | 12/1991 | Reylek et al. ............... 439/291 |
| 5,133,112 A | | 7/1992 | Gomez-Acevedo .......... 24/450 |
| 5,136,201 A | | 8/1992 | Culp .......................... 310/328 |
| 5,182,484 A | | 1/1993 | Culp .......................... 310/328 |
| 5,191,166 A | | 3/1993 | Smirlock et al. ........... 89/36.02 |
| 5,212,855 A | | 5/1993 | McGanty ...................... 24/452 |
| 5,284,330 A | | 2/1994 | Carlson et al. .......... 267/140.14 |
| 5,312,456 A | * | 5/1994 | Reed et al. .................... 24/442 |
| 5,319,257 A | | 6/1994 | McIntyre .................... 310/328 |
| 5,328,337 A | | 7/1994 | Kunta .......................... 417/310 |
| 5,429,875 A | * | 7/1995 | Okamoto et al. ............ 428/547 |
| 5,474,227 A | | 12/1995 | Krengel et al. .............. 228/147 |
| 5,486,676 A | | 1/1996 | Aleshin ................. 219/121.63 |
| 5,492,534 A | | 2/1996 | Athayde et al. ............. 604/141 |
| 5,497,861 A | | 3/1996 | Brotz .......................... 188/267 |
| 5,547,049 A | | 8/1996 | Weiss et al. ................ 188/267 |
| 5,611,122 A | | 3/1997 | Torigoe et al. ................. 24/442 |
| 5,656,351 A | | 8/1997 | Donaruma ................... 428/100 |
| 5,657,516 A | | 8/1997 | Berg et al. ..................... 24/452 |
| 5,669,120 A | | 9/1997 | Wessels et al. ............... 24/446 |
| 5,671,498 A | | 9/1997 | Martin et al. .............. 15/244.3 |
| 5,712,524 A | | 1/1998 | Suga .......................... 310/328 |
| 5,725,928 A | | 3/1998 | Kenney et al. ............. 428/100 |
| 5,797,170 A | | 8/1998 | Akeno ........................ 24/452 |
| 5,798,188 A | | 8/1998 | Mukohyama et al. ......... 429/34 |
| 5,814,999 A | | 9/1998 | Elie et al. .................... 324/662 |
| 5,816,587 A | | 10/1998 | Stewart et al. ........... 280/5.516 |
| 5,817,380 A | | 10/1998 | Tanaka ...................... 428/100 |
| 5,885,652 A | | 3/1999 | Abbott et al. ............. 427/163.2 |
| 5,945,193 A | | 8/1999 | Pollard et al. .............. 428/100 |
| 5,969,518 A | | 10/1999 | Merklein et al. ........... 324/173 |
| 5,974,856 A | | 11/1999 | Elie et al. ................... 73/11.04 |
| 5,979,744 A | | 11/1999 | Brigleb ..................... 229/87.01 |
| 5,983,467 A | * | 11/1999 | Duffy .......................... 24/442 |
| 6,029,783 A | | 2/2000 | Wirthlin ................... 188/267.1 |
| 6,086,599 A | | 7/2000 | Lee et al. .................... 606/108 |
| 6,102,912 A | | 8/2000 | Cazin et al. ................... 606/61 |
| 6,102,933 A | | 8/2000 | Lee et al. .................... 606/209 |
| 6,129,970 A | | 10/2000 | Kenney et al. ............. 428/100 |
| 6,148,487 A | | 11/2000 | Billarant ...................... 24/442 |
| 6,156,842 A | | 12/2000 | Hoenig et al. .............. 525/171 |
| 6,203,717 B1 | | 3/2001 | Munoz et al. ........... 252/62.52 |
| 6,257,133 B1 | | 7/2001 | Anderson ............... 100/162 B |
| 6,388,043 B1 | | 5/2002 | Langer et al. ................. 528/80 |
| 6,454,923 B1 | | 9/2002 | Dodgson et al. ............ 204/415 |
| 6,460,230 B2 | | 10/2002 | Shimamura et al. .......... 24/452 |
| 6,502,290 B1 | | 1/2003 | Tseng ......................... 28/161 |
| 6,544,245 B2 | * | 4/2003 | Neeb et al. .................... 24/442 |
| 6,546,602 B1 | * | 4/2003 | Eipper et al. ................. 24/442 |
| 6,593,540 B1 | | 7/2003 | Baker et al. ........... 219/121.63 |
| 6,598,274 B1 | | 7/2003 | Marmaropoulos |
| 6,605,795 B1 | | 8/2003 | Arcella et al. ......... 219/121.63 |
| 6,628,542 B2 | | 9/2003 | Hayashi et al. ............. 365/158 |
| 6,681,849 B2 | | 1/2004 | Goodson .................... 166/66.5 |
| 6,740,094 B2 | | 5/2004 | Maitland et al. ............ 606/108 |
| 6,742,227 B2 | | 6/2004 | Ulicny et al. ................. 24/442 |
| 6,766,566 B2 | | 7/2004 | Cheng et al. ................. 24/452 |
| 6,797,914 B2 | | 9/2004 | Speranza et al. ....... 219/121.64 |
| 6,815,873 B2 | | 11/2004 | Johnson et al. ............. 310/331 |
| 2002/0007884 A1 | | 1/2002 | Schuster et al. |
| 2002/0050045 A1 | | 5/2002 | Chiodo et al. |
| 2002/0062547 A1 | | 5/2002 | Chiodo et al. ............. 29/426.5 |
| 2002/0076520 A1 | | 6/2002 | Neeb et al. ................. 428/100 |
| 2002/0142119 A1 | | 10/2002 | Seward et al. ............. 428/36.9 |
| 2003/0120300 A1 | | 6/2003 | Porter ........................ 606/191 |
| 2004/0025639 A1 | * | 2/2004 | Shahinpoor et al. ........... 75/722 |
| 2004/0033336 A1 | | 2/2004 | Schulte ....................... 428/100 |
| 2004/0074061 A1 | | 4/2004 | Ottaviani et al. .............. 24/442 |
| 2004/0074062 A1 | | 4/2004 | Stanford et al. ............... 24/442 |
| 2004/0074063 A1 | | 4/2004 | Golden et al. ................. 24/442 |
| 2004/0074064 A1 | | 4/2004 | Powell et al. ................. 24/442 |
| 2004/0074068 A1 | | 4/2004 | Browne et al. ................ 24/442 |
| 2004/0074069 A1 | | 4/2004 | Browne et al. ................ 24/442 |
| 2004/0074070 A1 | | 4/2004 | Momoda et al. .............. 24/442 |
| 2004/0074071 A1 | | 4/2004 | Golden et al. ................. 24/442 |
| 2004/0117955 A1 | | 6/2004 | Barvosa-Carter et al. ..... 24/442 |

* cited by examiner

ELECTROSTATICALLY RELEASABLE FASTENING SYSTEM AND METHOD OF USE

CROSS REFERENCE TO RELATED APPLICATIONS

This application is a Continuation-in-Part of U.S. application Ser. No. 10/273,691 filed Oct. 19, 2002.

BACKGROUND

This disclosure relates to releasable attachment devices of the type used to fasten, retain, or latch together components of an apparatus or a structure that are to be separated or released under controlled conditions.

Hook and loop type separable fasteners are used to detachably join a plurality of members to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relative to each other in a direction parallel to their plane of contact. The term "pull force" refers to an action or stress resulting from applied forces that causes or tends to cause two contiguous parts of a body to move relative to each other in a direction normal to the plane of contact of the parts.

SUMMARY

Disclosed herein is a releasable fastening system. The system comprises a loop portion comprising a loop material, a hook portion comprising a plurality of hook elements, and an actuation device disposed in electrical communication with the loop portion and the hook portion. The actuation device is operable to provide a first electrostatic charge to the loop material and a second electrostatic charge to the hook elements.

In another embodiment, a releasable fastening system comprises a loop portion comprising a loop material, a first electrically conductive sheet on which said loop material is supported or attached, a first insulating layer disposed on said first electrically conductive sheet, and a loop portion support member disposed on said first insulating layer; a hook portion comprising a hook element mechanically engageable with said loop material, a second electrically conductive sheet at which said hook element is supported, a second insulating layer disposed at said second electrically conductive sheet, and a hook portion support member disposed at said second insulating layer; and an actuation device disposed in electrical communication with said loop portion and said hook portion, said actuation device being configured to impart an electrostatic charge of a first polarity to said loop material and a second polarity to said hook elements.

A method of operating a releasable fastening system comprises contacting a loop portion to a hook portion to form a releasable engagement, wherein said loop portion comprises a first electrically conductive sheet and a loop material attached to or disposed on said first electrically conductive sheet, and wherein said hook portion comprises a second electrically conductive sheet and a hook element attached to or disposed on said second electrically conductive sheet; maintaining constant shear forces and constant pull-off forces between said loop portion and said hook portion; introducing a first electrostatic charge to said loop portion; and introducing a second electrostatic charge to said hook portion.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
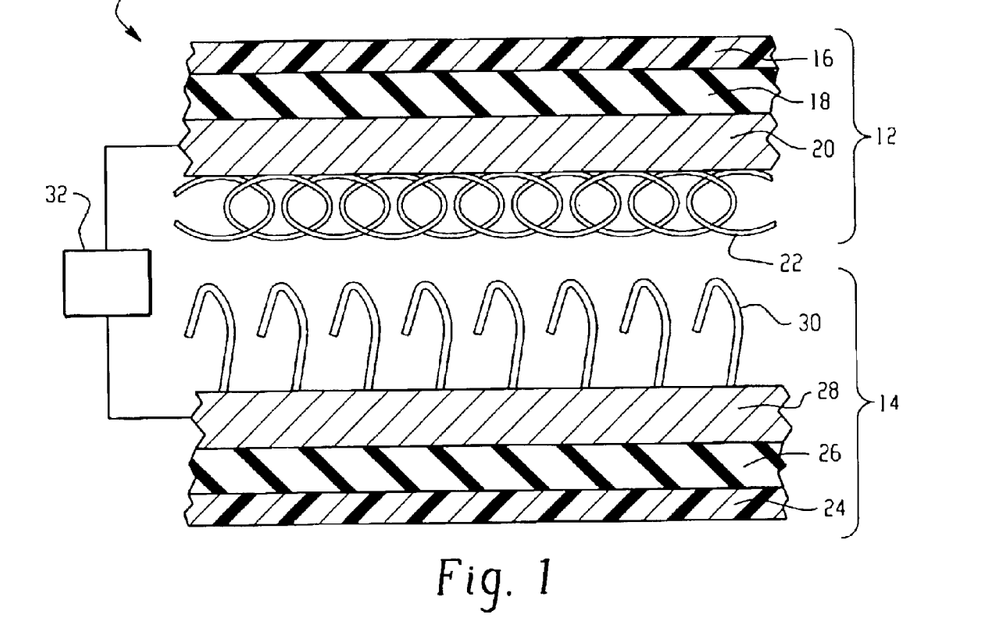
FIG. 1 is a cross-sectional view of a releasable fastening system.

Referring now to FIG. 1, one exemplary embodiment of a releasable fastening system is shown generally at 10 and is hereinafter referred to as "system 10." System 10 provides for the controlled engagement of hook-and-loop material via an electrostatic mechanism and a method for the attachment of surfaces. The electrostatic mechanism effects the mutual attraction and the mutual repulsion of the hook material and the loop material to selectively enhance passive mechanical engagement and disengagement. In particular, the electrostatic mechanism assists in providing the on-demand remote engagement and disengagement of various facial surfaces including, but not limited to, joints and other points of attachment.

System 10 comprises a loop portion generally designated 12 and a hook portion generally designated 14. Loop portion 12 comprises a support 16, an insulating layer 18 disposed on support 16, an electrically conductive sheet 20 disposed on insulating layer 18, and a loop material 22 attached to the electrically conductive sheet 20. Hook portion 14 comprises a support 24, an insulating layer 26 disposed on support 24, an electrically conductive sheet 28 disposed on insulating layer 26, and hook elements 30 attached to the electrically conductive sheet 28. The selective engagement and disengagement of hook elements 30 with loop material 22 is controlled via an actuation device 32 disposed in electrical communication with loop portion 12 and with hook portion 14. Dissimilar electrical charges applied to loop material 22 and to hook elements 30 from actuation device 32 effect the electrostatic attraction of loop material 22 to hook elements 30 (thus enhancing the engagement of portions 12, 14), while similar electrical charges applied to loop material 22 and to hook elements 30 effect the repulsion of loop material 22 and hook elements 30 (thus enhancing the disengagement of portions 12, 14).

During engagement of portions 12, 14, either portion is biased in the direction of the other portion such that facial surfaces (i.e., surfaces having the loop material or hook elements attached thereto) thereof are disposed in intimate contact with the other. Alternatively, both portions may be simultaneously biased in the direction of the other portion such that intimate contact is maintained between the facial surfaces. The engagement of the facial surfaces creates an interfacial joint that is strong when one of the surfaces is subject to shear or subject to a pull force, but weaker when one of the surfaces is subject to a peeling force. A peeling force is a force that is concentrated in a localized region of adjacently-positioned hook elements and results in the mechanical release of the hook elements from the loop material in the localized region (as opposed to "pull-off," which is the simultaneous mechanical release of all of the hook elements over the engaged facial surfaces when the facial surfaces are biased in opposing directions and in directions orthogonal to the direction in which the interfacial engagement extends). Continuous application of the peeling force results in a wave-like travel of the release front across the interengaged facial surfaces. The force needed for the application of a peeling force is lower than the force needed for pull-off due to the fact that only a few hook elements at a time are released in the former while all of the hook elements are released simultaneously in the latter. For example, when portions 12, 14 are pressed into facial engagement, hook elements 30 engage with loop material 22 such that the close spacing of hook elements 30 resists substantial lateral movement when subjected to shearing forces in the directions of the plane of interfacial engagement. Similarly, when the engaged facial surfaces are subjected to a force orthogonal to this plane (pull-off forces), hook elements 30 resist substantial separation of portions 12, 14. However, when hook elements 30 are subjected to the peeling force, hook elements 30 can become more easily disengaged from loop material 22. In order to provide a point of leverage for separating portions 12, 14 using a peeling force, either support 16 or support 24 is preferably flexible.

Loop material 22 generally comprises either a random- or ordered arrangement of loops supported or attached to the electrically conductive sheet 20. Each loop comprises one or more strands of material capable of maintaining an electrostatic charge configured to define a pile. Materials from which the loops can be configured include, but are not limited to, plastics, fabrics, metals, combinations of the foregoing materials, and the like. Suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers.

Hook elements 30 comprise either a random- or ordered arrangement of hook elements supported or attached to the electrically conductive sheet 28. Each hook element 30 comprises a member fabricated from a material that is capable of maintaining an electrostatic charge and having a shape such that passive mechanical engagement with a loop of loop material 22 is facilitated upon the pressing together of portions 12, 14. Materials from which hook elements 30 can be fabricated include, but are not limited to, plastics, fabrics, metals, combinations of the foregoing materials, and the like. Suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. The shape of each hook element 30 is preferably that of an inverted "J" although other shapes, for example, mushroom shapes, knobs, anchor shapes, "T" shapes, spirals, or any other mechanical form of a hook-like element may be utilized.

Figure 2:
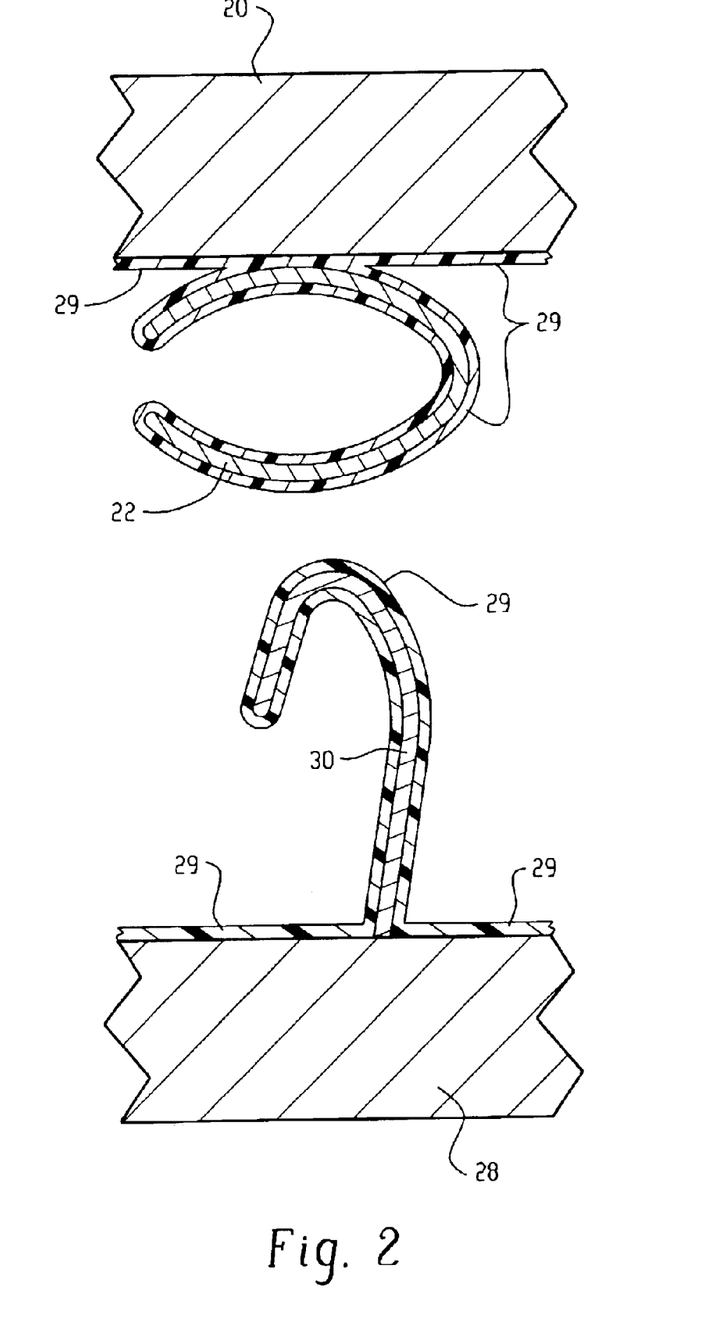
FIG. 2 is a cross-sectional view of the hook elements and loop material of the releasable fastening system of FIG. 1 showing insulative coatings disposed thereon.

In order to minimize the migration and dissipation of electrostatic charge, insulative coatings are preferably applied to the loops of loop material 22, hook elements 30, and electrically conductive sheets 20, 28, as is shown with reference to FIG. 2. Insulative coatings, shown at 29, are preferably disposed as needed at all exposed surfaces of loop material 22, hook elements 30, and electrically conductive sheets 20, 28 to prevent migration of charge between the various elements as well as the dissipation of charge to the surrounding environment.

Referring now to both FIGS. 1 and 2, other exemplary embodiments of hook elements 30, in addition to being capable of maintaining an electrostatic charge, may further be formed of a material that provides a shape-changing capability and/or a change in flexural modulus to each individual element. For example, the shape-changing capability and/or a change in flexural modulus of hook elements 30 may be effected through the use of shape memory alloys, shape memory polymers, piezoelectric materials, magnetostrictive materials (also referred to as magneto-restrictive materials), ionic polymer metal composites, elastic memory composites, electroactive polymers and metal composites, and the like.

Electrically conductive sheets 20, 28 preferably comprise planar members through which opposing charges are respectively communicated to loop material 22 and hook elements 30 from actuation device 32. Electrically conductive sheets 20, 28 may be uniform in thickness or they may be variously thin or thick. The flexibility or rigidity of each electrically conductive sheet 20, 28 may be determined by the material from which each sheet 20, 28 is fabricated as well as its thickness. Sheets 20, 28 are disposed respectively at insulating layers 18, 26 using adhesives or mechanical mean, e.g., bolts, clamps, or other mechanical fastener. Materials from which electrically conductive sheets 20, 28 may be fabricated include, but are not limited to, metals such as copper, aluminum, silver, alloys such as steel, electrically conductive polymers, combinations of the foregoing materials, and the like.

Insulating layers 18, 26 are disposed at electrically conductive sheets 20, 28 to inhibit the discharge of charge through supports 16, 24. Materials from which insulating layers 18, 26 can be fabricated include, but are not limited to, ceramics, glass, rubber, non-conductive thermosets and thermoplastic materials (e.g., polyethylene, polytetrafluoroethylene, nylon), combinations of the foregoing materials, and the like.

Supports 16, 24 at which loop portion 12 and hook portion 14 are respectively disposed may be rigid or flexible depending upon the application in which system 10 is intended to be used. Suitable materials for fabricating supports 16, 24 include plastics, fabrics, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. Adhesives may be applied to surfaces of the supports (preferably opposite the surfaces at which the insulating layers are disposed) for application of releasable fastening system 10 to an apparatus or structure. Alternatively, releasable fastening system 10 may be secured to an apparatus or structure by bolts, by welding, or any other mechanical securement means. It should be noted that, unlike traditional hook and loop fasteners that typically require at least one support to be flexible so that a peeling force can be applied for separation of the hook and loop fastener, both supports 16, 24 could be fabricated from a rigid or inflexible material in view of the remote releasing capability provided.

Figure 3:
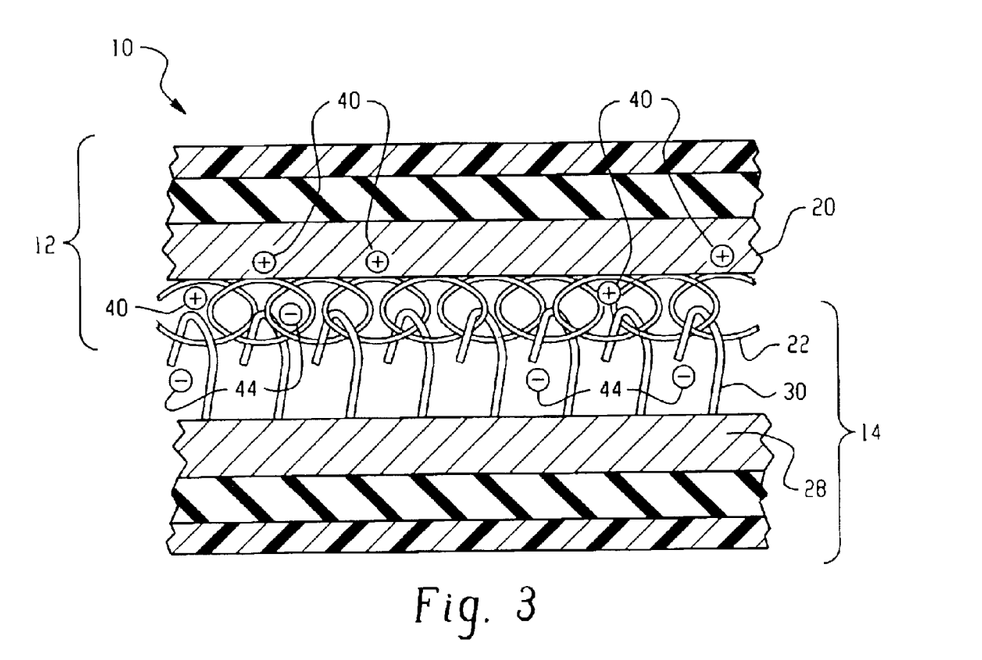
FIG. 3 is a cross-sectional view of the releasable fastening system of FIG. 1, wherein the system is engaged.

In FIG. 3, the engagement of loop portion 12 and hook portion 14 of system 10 is shown. The passive mechanical engagement of portions 12, 14 is effected by the biasing of loop portion 12 and hook portion 14 together such that the "J" portions of hook elements 30 are disposed or entangled with loop material 22. After or during the passive engagement of loop material 22 and hook elements 30, the actuation device 32 is powered and supplies a positive charge 40 to either the loop material 22 or the individual hook elements 30 and a negative charge 44 to the other of the hook elements 30 or the loop material 22 to cause the electrostatic attraction of loop material 22 and hook elements 30, thereby increasing the bond strength between portions 12, 14, e.g., the shear forces, pull-off forces and peel forces marginally increase.

Figure 4:
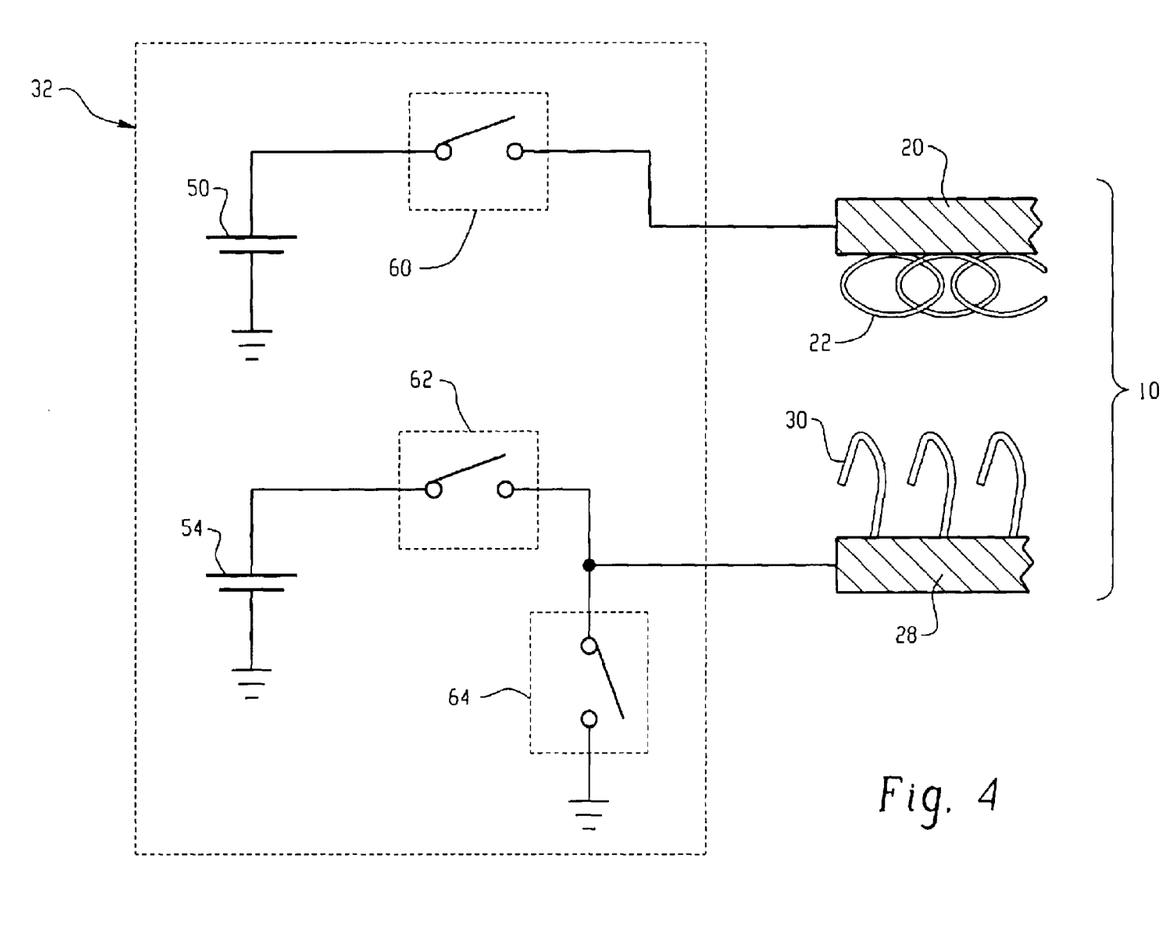
FIG. 4 is a schematic representation of an actuation device disposed at the releasable fastening system of FIG. 1.

Referring now to FIG. 4, actuation device 32 and its relationship to electrically conductive sheets 20, 28 is shown. In one exemplary embodiment, actuation device 32 is configured to supply an electrical current to electrically conductive sheets 20, 28. By applying a voltage, the loop material 22 and the hook elements 30 are electrostatically charged to effect the electrostatic attraction or repulsion of the loop material 22 and the hook elements 30. The electrical signal may be delivered in conjunction with other types of signals (e.g., a magnetic signal, a heat signal, a pneumatic signal, a mechanical actuation mechanism, or a combination of the foregoing signals and mechanisms) that provide a shape-changing capability or a change in flexural modulus in the hook elements to more easily cause the hook elements to engage with the loop material. The type of signal employed is dependent upon the particular material from which the hook elements and/or the loop material is fabricated.

Actuation device 32 preferably comprises a first power source 50 and a second power source 54. Each power source 50, 54 is preferably a direct current (DC) power source disposed in electrical communication with its respective electrically conductive sheet 20, 28. Switching devices 60, 62 (e.g., transistors) are preferably disposed at the anodes of their respective power sources 50, 54 to switch the releasable fastening system between three operating states. Switching device 64 is preferably disposed intermediate switching device 62 and electrically conductive sheet 28.

Figure 5:
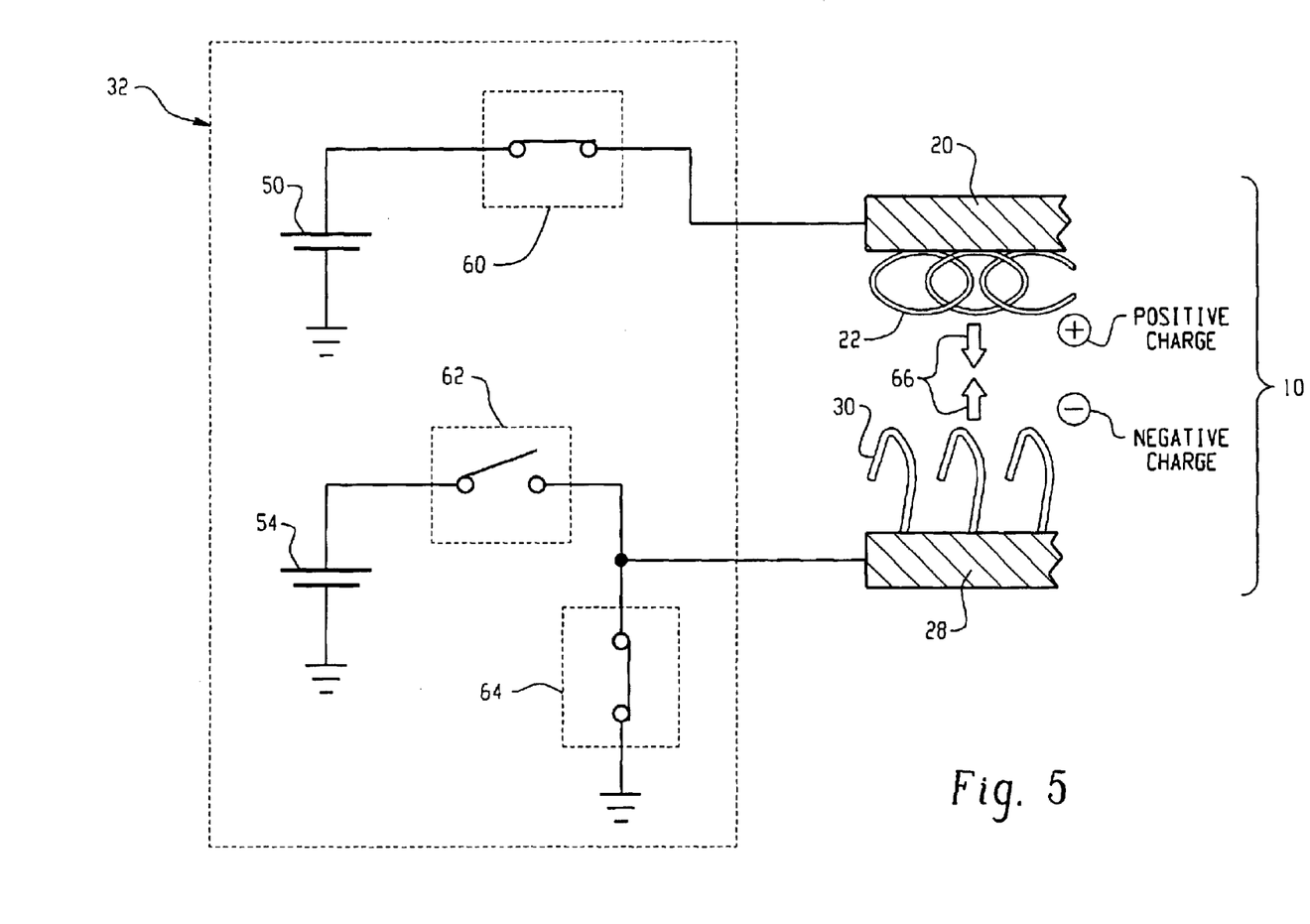
FIGS. 5 and 6 are schematic representations of operating states of the releasable fastening system of FIG. 1.

In a first operating state of actuation device 32 as shown in FIG. 5, switching devices 60, 64, are closed while switching device 62 is open. Such a combination results in loop material 22 and hook elements 30 being charged to opposite polarities to effect their mutual attraction (shown by arrows 66). Loop portion 12 and hook portion 14 are then mechanically biased together to effect their engagement. The mutual attraction of loop material 22 and hook elements 30, in addition to the mechanical engagement of loop material 22 with hook elements 30, enables hook elements 30 to be more uniformly and completely engaged with loop material 22, thereby facilitating the engagement of the releasable fastening system 10.

In a second operating state of releasable fastening system 10 also shown in FIG. 5, switching devices 60, 62, 64 are initially open and neither loop material 22 nor hook elements 30 are charged. Loop portion 12 and hook portion 14 are biased together to passively engage loop material 22 and hook elements 30. The loops and hook elements 30 are then charged to opposing polarities by closing switching devices 60, 64 (as in the first operating state) to more uniformly and completely engage hook elements 30 with loop material 22. Switching devices 60, 64 are then opened because a continuous charge is not required to maintain the mechanical engagement of loop material 22 and hook elements 30.

Figure 6:
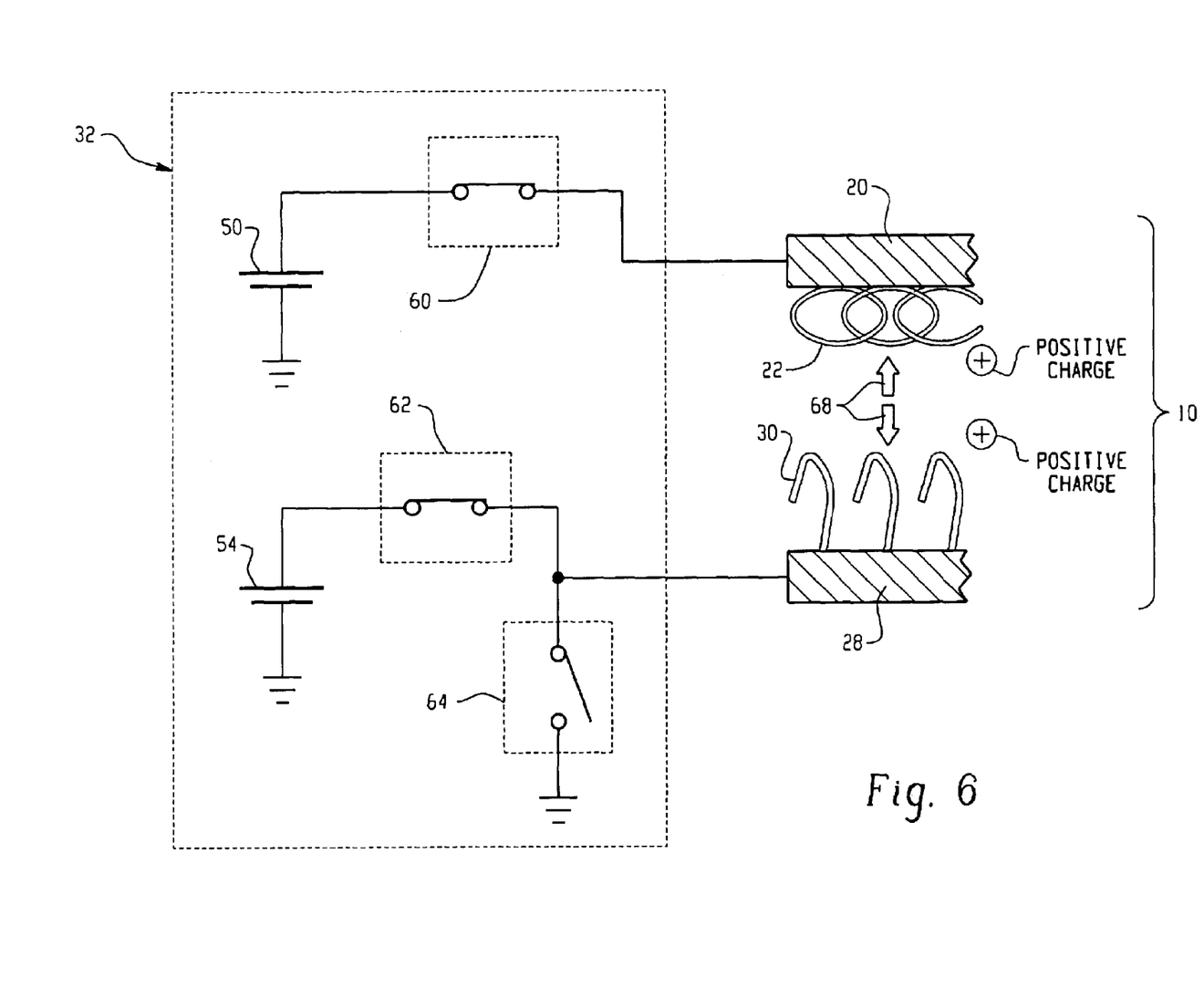

An operating state of actuation device 32 in which releasable fastening system 10 is disengaged is shown in FIG. 6. Loop material 22 and hook elements 30 may be disengaged by maintaining switching devices 60, 62 in the closed position while keeping switching device 64 open. Such a configuration results in the disposition of similar polarities with respect to loop material 22 and hook elements 30. In the exemplary embodiment shown, the similar polarities are positive. By maintaining similar polarities across loop portion 12 and hook portion 14, the repulsion (as indicated by arrows 68) can be effected, thereby facilitating the disengagement of releasable fastening system 10.

The releasable fastening system as described above is extremely versatile and can be utilized in a wide variety of applications. For example, the releasable fastening system can be employed to releasably attach two or more automotive structural elements together. Welded and adhesively bonded "rigid" attachments provide fixed load paths. By applying or removing an electrostatic charge to the components of a system, however, load paths can be selectively created or eliminated. The selective creation of a load path may provide an additional force to maintain the integrity of a structure subjected to a stressing force, and the selective elimination of the load path may be used to provide for the controlled failure of a structure when subjected to a stressing force. Other examples include providing a mechanism for opening and closing apparatus such as trunks, doors, glove box, and the like. The releasable fastening system may also be employed for releasable on-demand attachment mechanisms such as for releasable attachment for batteries, fuels cells, cargo containers, vehicle interior and exterior components, and the like. Moreover, the releasable fastening systems can be configured such that an energy source is not required to maintain engagement of the joint. Energy, i.e., the signal supplied by the actuation device, can be used to provide separation, thereby minimizing the impact on energy sources during use of the releasable fastening system.

While the invention has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this disclosure, but that the disclosure will include all embodiments falling within the scope of the appended claims.

What is claimed is:

1. A releasable fastening system, comprising:
   a loop portion comprising a first insulative coating disposed on a loop material;
   a hook portion comprising a second insulative coating disposed on a plurality of hook elements; and
   an actuation device disposed in electrical communication with said loop portion and said hook portion, said actuation device being operable to provide a first electrostatic charge to said loop material and a second electrostatic charge to said hook elements, wherein said first insulative coating is configured to inhibit migration of said first electrostatic charge from said loop material, and wherein said second insulative coating is configured to inhibit migration of said second electrostatic charge from said hook elements.

2. The releasable fastening system of claim 1, wherein said actuation device comprises,
   a first power source disposed in electrical communication with said loop portion, and
   a second power source disposed in electrical communication with said hook portion.

3. The releasable fastening system of claim 1, wherein said electrostatic charges are of opposing polarities to effect the mutual attraction of said loop portion and said hook portion.

4. The releasable fastening system of claim 1, wherein said electrostatic charges are of the same polarities to effect the mutual repulsion of said loop portion and said hook portion.

5. A releasable fastening system, comprising:
   a loop portion comprising a loop material, a first electrically conductive sheet on which said loop material is supported or attached, a first insulating layer disposed on said first electrically conductive sheet, and a loop portion support member disposed on said first insulating layer;
   a hook portion comprising a hook element mechanically engageable with said loop material, a second electrically conductive sheet at which said hook element is supported, a second insulating layer disposed at said second electrically conductive sheet, and a hook portion support member disposed at said second insulating layer; and
   an actuation device disposed in electrical communication with said loop portion and said hook portion, said actuation device being configured to impart an electrostatic charge of a first polarity to said loop material and a second polarity to said hook elements.

6. The releasable fastening system of claim 5, further comprising,
   a first insulative coating disposed on said loop material and said first electrically conductive sheet, and
   a second insulative coating disposed on said hook element and said second electrically conductive sheet.

7. The releasable fastening system of claim 5, wherein said loop material comprises an arrangement of loops configured to define a pile, each of said loops comprising one or more strands.

8. The releasable fastening system of claim 5, wherein said loop material comprises a plastic, a fabric, a metal, or a combination of the foregoing materials.

9. The releasable fastening system of claim 5, wherein said hook element comprises a J-shaped orientation, a mushroom shape, a knob shape, an anchor shape, a T-shape, a spiral shape, or a combination comprising at least one of the foregoing shapes.

10. The releasable fastening system of claim 5, wherein said hook element comprises a plastic, a fabric, a metal, or a combination of the foregoing materials.

11. The releasable fastening system of claim 5, wherein said actuation device comprises:
    a first power source disposed in electrical communication with said first electrically conductive sheet through a first switching device, and
    a second power source disposed in electrical communication with said second electrically conductive sheet through a second switching device.

12. The releasable fastening system of claim 11, further comprising a third switching device disposed in electrical communication with a cathode of said second power source.

13. The releasable fastening system of claim 11, wherein said first and second power sources are direct current power sources.

14. A method of operating a releasable fastening system, comprising:
    contacting a loop portion to a hook portion to form a releasable engagement, wherein said loop portion comprises a first electrically conductive sheet and a loop material attached to or disposed on said first electrically conductive sheet, and wherein said hook portion comprises a second electrically conductive sheet and a hook element attached to or disposed on said second electrically conductive sheet;
    maintaining constant shear forces and constant pull-off forces between said loop portion and said hook portion;
    introducing a first electrostatic charge to said loop portion; and
    introducing a second electrostatic charge to said hook portion.

15. The method of claim 14, wherein said introducing said first and second electrostatic charges to said loop portion and said hook portion comprises supplying currents to said loop portion and said hook portion.

16. The method of claim 15, wherein said supplying currents to said loop portion and said hook portion comprises electrostatically charging said loop portion and said hook portion with opposite polarities to effect the mutual attraction of said loop portion and said hook portion.

17. The method of claim 15, wherein said supplying currents to said loop portion and said hook portion comprises electrostatically charging said loop portion and said hook portion with similar polarities to effect the mutual repulsion of said loop portion and said hook portion.

18. The method of claim 15, further comprising introducing a signal to said hook portion to cause a change in a shape orientation, a flexural modulus property, or a combination of the foregoing to a hook element of said hook portion.

* * * * *